United States Patent [19]

Takizawa et al.

[11] Patent Number: 4,803,630

[45] Date of Patent: Feb. 7, 1989

[54] VEHICLE HEIGHT CONTROL SYSTEM

[75] Inventors: Shozo Takizawa; Mitsunori Maruyama; Minoru Tatemoto, all of Okazaki; Shigeki Ohtagaki, Himeji, all of Japan

[73] Assignee: Mitsubishi Denki Kabushiki Kaisha, Japan

[21] Appl. No.: 195,475

[22] Filed: May 3, 1988

Related U.S. Application Data

[63] Continuation of Ser. No. 766,955, Aug. 19, 1985, abandoned.

[30] Foreign Application Priority Data

Aug. 28, 1984 [JP] Japan ................... 59-178754

[51] Int. Cl.$^4$ ............................................. B60G 17/00
[52] U.S. Cl. ..................... 364/424.05; 280/707; 280/6.12; 180/41
[58] Field of Search ............... 364/424, 425; 280/703, 280/707, 6 R, 6 H, DIG. 1, 689; 180/41

[56] References Cited

U.S. PATENT DOCUMENTS

| | | | |
|---|---|---|---|
| 3,608,925 | 9/1971 | Murphy | 280/112 |
| 4,162,083 | 7/1979 | Zabler et al. | 280/703 |
| 4,564,214 | 1/1986 | Tokunaga et al. | 280/708 |
| 4,575,115 | 3/1986 | Tatemoto et al. | 280/707 |
| 4,575,116 | 3/1986 | Miyata | 280/707 |
| 4,610,462 | 9/1986 | Kumagai et al. | 280/DIG. 1 |
| 4,621,832 | 11/1986 | Nakashima et al. | 280/707 |
| 4,647,069 | 3/1987 | Iijima | 280/707 |

FOREIGN PATENT DOCUMENTS

| | | |
|---|---|---|
| 0014757 | | European Pat. Off. |
| 0033204 | 3/1981 | European Pat. Off. |
| 0015167 | 12/1983 | European Pat. Off. |
| 56-60711 | 5/1981 | Japan. |
| 2106053 | 7/1983 | United Kingdom. |

OTHER PUBLICATIONS

"Electronic Sensing for Vehicle Height Control", SAE paper 770396, pp. 11–22, by Hegen et al., 1979.
"Chassis Electronic Control Systems", SAE paper 840258, pp. 1–12, by Mizuguchi et al., 1984.

Primary Examiner—Parshotam S. Lall
Assistant Examiner—David Goldman
Attorney, Agent, or Firm—Leydig, Voit & Mayer

[57] ABSTRACT

A vehicle height control system wherein vehicle height control is inhibited when the vehicle is turning and in a rolling state, the state when the control is inhibited being based upon the vehicle's speed from a speed sensor, the steering angular velocity of a steering wheel from a steering angle sensor and the outputs from sensors detecting the height of the vehicle body on both sides of the vehicle with respect to the wheels, which by the pattern of their outputs, represent that the vehicle is inclined from side-to-side and in the rolling state.

7 Claims, 6 Drawing Sheets

VEHICLE HEIGHT CONTROL SYSTEM

This application is a continuation of application Ser. No. 06/766,955 filed Apr. 19, 1985 now abandoned.

BACKGROUND OF THE INVENTION

This invention relates to a vehicle height control system, and in particular to a highly reliable vehicle height control system in which a vehicle height control is inhibited for an apparent variation, i.e. a temporary change of the vehicle's height arising at the time when a vehicle is turning.

A vehicle height control system has been proposed in Japanese patent application laid-open No. 56-60711 in which the vehicle's height is adjusted to a target level by means of sensors capable of detecting the change of the vehicle's height. It is known that a vehicle's height is advantageously controlled as the load weight of a vehicle is changed. However, the vehicle's height also changes with the change of the surface of a road or during the turning of the vehicle during the running operation thereof, in spite of the fact that the load weight of the vehicle is not actually changed. To control the vehicle's height each time such an apparent change occurs does not improve performance as well as being uncomfortable to a vehicle's driver or passengers.

Therefore, it is required in a vehicle height control system that the vehicle's height be controlled as soon as the load weight is actually changed when the vehicle is stopped but that the vehicle's height not be controlled for apparent changes of the vehicle's height during the running of the vehicle.

To this end, one may consider that no vehicle height control should be carried out during the running mode thereof. However, the following problems will then arise:

(1) If the vehicle's height is controlled according to the change of the load weight when the vehicle is stopped and the vehicle is started before the vehicle height control has not yet been completed, the vehicle's height is changed owing to the acceleration thereof, resulting in the completion of the vehicle height control although the vehicle's height has not yet attained the target level according to the actual load weight. In this case, since the vehicle height control is not re-activated until the vehicle is again stopped, the vehicle height control is not yet completed;

(2) If an air leakage in the air suspension occurs during the vehicle's running for a long time interval, the vehicle's height is gradually reduced due to that air leakage and can not be corrected by the vehicle height control. Furthermore, multi-level or multi-stage control can not be carried out for different vehicle driving speeds, in which, for example, a lower vehicle's height is set for a high speed running.

As indicated above, if the vehicle height control is completely inhibited during the running mode of a vehicle, an effective vehicle height control is not achieved. Thus, there has been already proposed a system for solving the above problems in which the vehicle control is initiated immediately in response to the change of the vehicle's height in the stopped state while during the running the initiation of the vehicle height control is delayed by means of a timer or the time interval for determining the initiation of the vehicle height control is extended.

However, although this system can inhibit the initiation of the vehicle height control for the variation of road surfaces during the running mode, it can not inhibit said initiation in a case such as the turning of a vehicle where the vehicle's height is being changed for a relatively long interval. This is because if one intends to inhibit the vehicle height control from operating for changes in the vehicle's height during the time of long internal turning, the control system of the prior art must delay the initiation of the vehicle height control during the running mode by a long time interval or to extend the time interval for the determination of the vehicle height control whereby it will be difficult to initiate the actual vehicle height control when required. To the contrary, if one intends to surely carry out the normal or real vehicle height control during the running mode, it is advantageous in the prior art to shorten the delay time of the initiation of the vehicle height control or to shorten such a long time interval for the determination of the initiation of the vehicle height control. However, in the prior art system, such a vehicle height control will be disadvantageously initiated even for the apparent change of the vehicle's height during the vehicle's turning for a long time interval.

According to such conventional systems, particularly during the running of a vehicle, it is difficult to distinguish between an actual change in the vehicle's height and a temporary change in the vehicle's height due to the turning of the vehicle and the like, so that if the vehicle height control is desired to be carried out quickly during the running mode of operation of the vehicle, it is difficult to inhibit the vehicle height control during the turning.

On the other hand, SAE paper 770396 on pages 11–22 discloses "Electronic Sensing for Vehicle Height Control" by R. W. Hegel et al, in which optical vehicle's height sensors and an air pressure source for the vehicle height control are employed for weight and space savings and simplified installation; SAE paper 840258 on pages 1–12 discloses "Chassis Electronic Control Systems" by M. Mizuguchi et al, in which optical vehicle's height sensors and an air pressure source are also employed while fail-safe mechanisms are incorporated in the event of system failure and a central diagnostic terminal is provided for system checking.

SUMMARY OF THE INVENTION

It is accordingly an object of the present invention to provide a highly reliable vehicle height control system wherein the vehicle height control is not initiated when it is determined that the vehicle is turning even though the condition of the initiation of the vehicle height control is met.

To achieve this object, the present invention provides a vehicle height control system including: vehicle's body height sensors (3a,3b) for detecting one of a plurality of classified height ranges to which the height of the vehicle's body (1) with respect to the vehicle's wheel or the vehicle's wheel axle belongs, a steering angle sensor (9) for detecting the steering angle of a steering wheel of the body (8), a vehicle speed sensor (13) for detecting the speed of the vehicle's wheels (7), a control unit (2) for determining the initiation or the stop of the vehicle height control, and a suspension (6a,6b) which incorporates the vehicle's height adjusting mechanism (6,11,12,14–18). This control unit comprises first means for determining the turning state of the vehicle on the basis of outputs from the vehicle speed sensor, the steering angle sensor and the vehicle's body height sensors, and second means for inhibiting the vehicle height control while the vehicle is in the turning state.

Preferably, the first means comprises means for calculating the speed of the vehicle, means for calculating a threshold value for the steering angular velocity according to the vehicle speed, and means for determining, as the turning state, the amount of side-to-side inclination of the vehicle representing that the vehicle is in a rolling state based upon the outputs of the vehicle's body height sensors when the steering angular velocity exceeds the threshold value. This means for determining the rolling state of the vehicle comprises means for determining that the vehicle body is inclined from side-to-side from the outputs of the vehicle's body height sensors which represent by the pattern of their outputs that the vehicle is turning.

Alternatively, the first means comprises means for calculating the speed of the vehicle, means for calculating a threshold value for the steering angular velocity according to the vehicle speed, and means for determining, as the turning state, that the vehicle body is in a rolling state when the steering angular velocity does not exceed the threshold value. In this alternative embodiment, when the vehicle body has been in a rolling state, and the outputs of the vehicle's body height sensors do not indicate the normal state, the steering wheel is not returned to its normal position, and the speed of the vehicle is not zero, the vehicle height control is inhibited.

Furthermore, the control unit may comprise means for releasing the inhibiting of the vehicle height control when the outputs of the vehicle's body height sensors return to a normal position, when the steering wheel is reversely rotated, or when the speed of the vehicle becomes zero.

BRIEF DESCRIPTION OF THE DRAWINGS

The present invention will now be more readily apparent from the accompanying drawings in which.

throughout the figures, the same reference numerals indicate identical or corresponding components.

DETAILED DESCRIPTION OF THE PREFERRED EMBODIMENTS

There will now be described a vehicle height control system according to the present invention along the preferred embodiment thereof.

Figure 1:
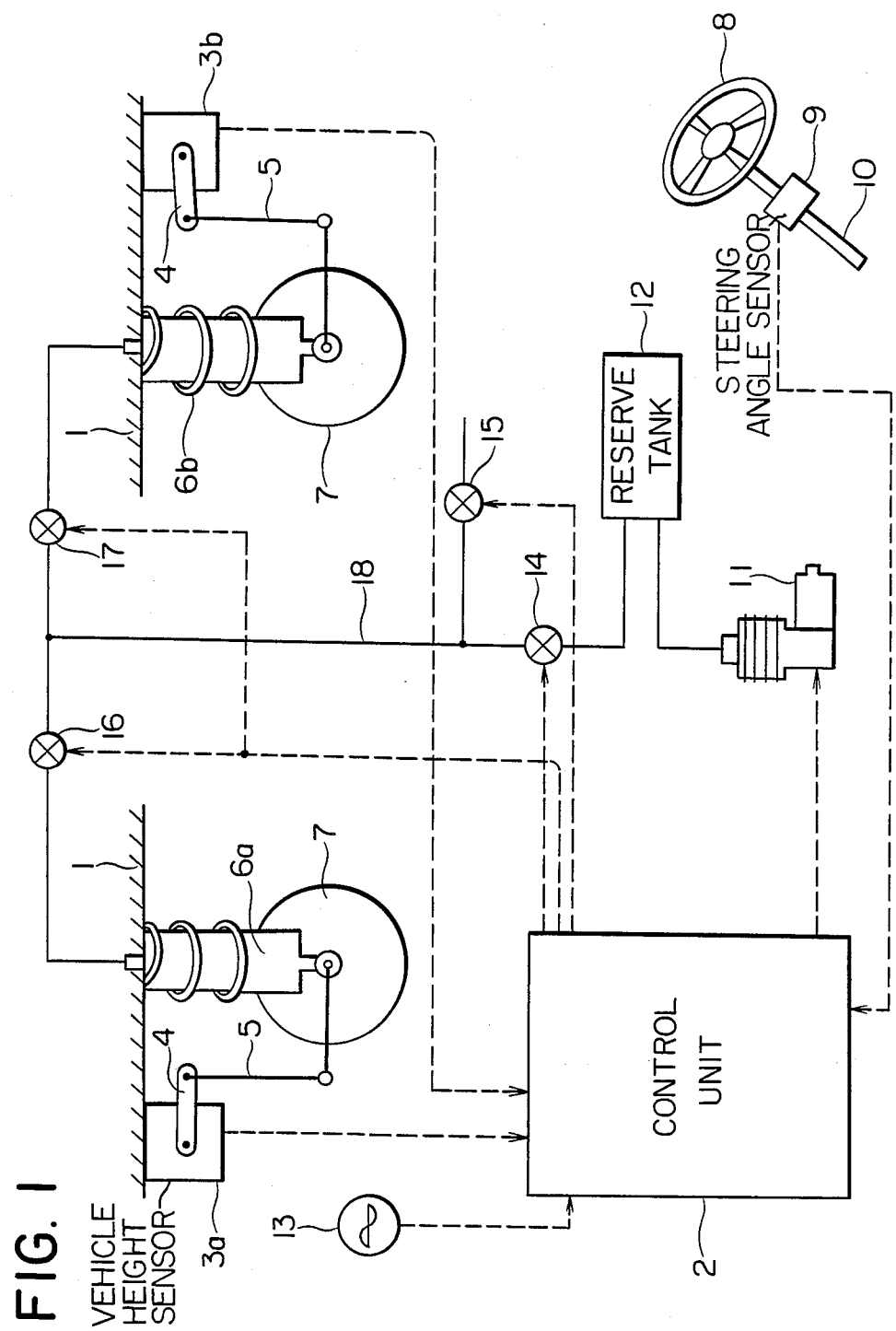
FIG. 1 shows a basic diagram of one embodiment of a vehicle height control system according to the present invention.

In FIG. 1 showing one preferred embodiment of a vehicle height control system according to the present invention, are shown a vehicle's body 1, a control unit 2, vehicle's body height sensors 3a and 3b, an arm 4 of the vehicle's height sensor 3a or 3b, a rod 5, suspensions 6a and 6b, vehicle's wheels 7, a steering wheel 8, a steering angle sensor 9, a steering shaft 10, a compressor 11, a reserve tank 12, a vehicle speed sensor 13, an inflation valve 14, an exhaust valve 15, air valves 16 and 17, and an air pipe 18.

The control unit 2 reads out the information output from the vehicle's body height sensors 3a and 3b, the vehicle speed sensor 13, and the steering angle sensor 9 to determine the initiation and the stop of a vehicle height control. In the case where a vehicle lifting control is desired, the compressor 11 is driven according to the air flow requirements, the inflation valve 14 is opened, the exhaust valve 15 is closed, and the air valves 16 and 17 are opened/closed according to the required adjustments, whereby the height of the vehicle's body 1 is lifted by means of the suspension 6a and 6b associated with a vehicle height control mechanism. In the case where a vehicle lowering control is desired, the inflation valve 14 is closed, the exhaust valve 15 is opened, and the air valves 16 and 17 are opened/closed according to the required adjustments, whereby the height of the vehicle's body 1 is lowered by means of the suspensions 6a and 6b.

Figure 2:
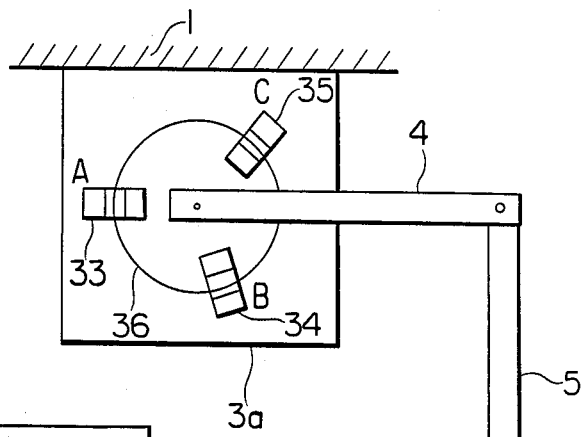
FIG. 2 shows a schematic arrangement of vehicle's body height sensors used in the vehicle height control system shown in FIG. 1.

The arrangement of the vehicle's body height sensor 3a will now be described with reference to FIG. 2. It is to be noted that the vehicle's body height sensor 3b is similarly applied. The vehicle's body height sensor 3a is mounted on the vehicle's body 1. The arm 4 interconnects a disc 36 having slits formed therethrough in the sensor 3a with the rod 5 fixed to a vehicle's wheel axle 30. Photo-interrupters 33, 34, and 35 output on/off electrical signals on the basis of an optical on/off (passage/interruption) pattern provided by the slits in the disc 36 in accordance with the rotary angle of the disc 36. In this vehicle's body height sensor 3 thus arranged, the change of the height between the vehicle's body 1 and the vehicle's wheels 7 or the vehicle's wheel axle 30 will operate the rod 5 and the arm 4 to rotate the slit 36, whereby coded signals corresponding to various heights are output as detected signals from the photo-interrupters 33, 34, and 35. In this embodiment, a 3-bit code signal is output from terminals A, B, and C whereby the change of the vehicle's body height in the range of $2^3 = 8$ can be detected.

Figure 3:
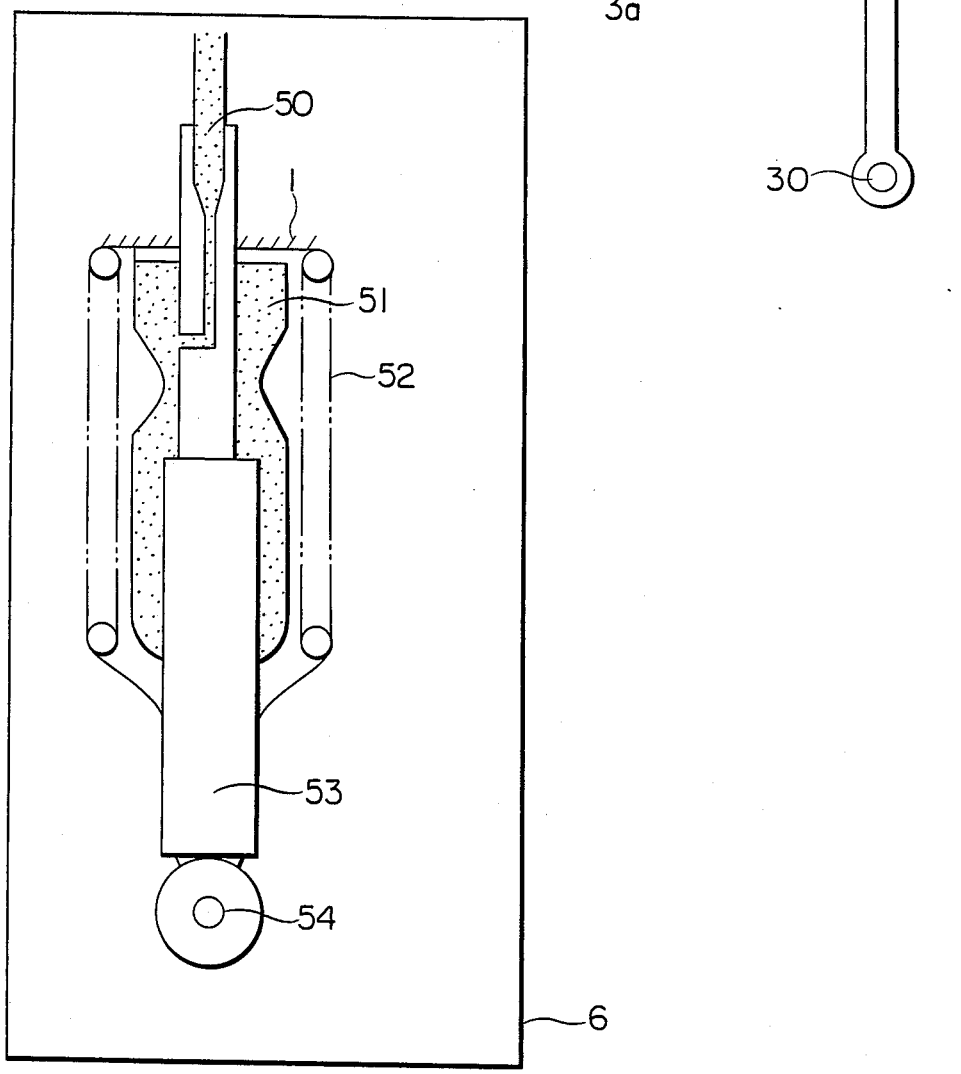
FIG. 3 shows a construction of a suspension for controlling the vehicle's height used in the vehicle height control system shown in FIG. 1.

In FIG. 3 showing one example of the suspension 6 forming a vehicle height control mechanism, an air path 50 is connected to an air chamber 51 around which a coil spring 52 is provided. A shock absorber 53 is connected to an interconnecting portion 54 with the vehicle's wheel axle 30.

Air fed through the air path 50 to the air chamber 51 increases the pressure of the air chamber 51 whereby the vehicle's height, i.e. the height between the vehicle's body 1 and the interconnecting portion 54, which is connected to the vehicle's wheel axle 30 may be lifted. On the other hand, air may be exhausted through the air path 50 from the air chamber 51, thereby lowering the vehicle's height. The compressor 11, the valves 14 and 15, the air valves 16 and 17, and the reserve tank 12 which form the vehicle's height adjusting means are required for such air feed and air exhaustion. This vehicle's height adjusting means may also include an air cleaner and/or an air drier (not shown).

Figure 4:
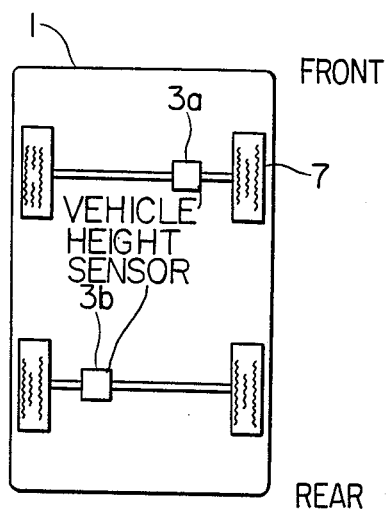
FIGS. 4 and 5 show the dispositions of vehicle's body height sensors mounted on the sides of the front and the rear wheels of a vehicle, respectively.
Figure 5:
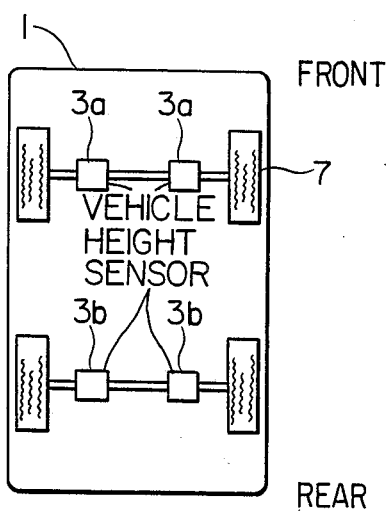

FIGS. 4 and 5 show the mounting positions of the vehicle sensors 3a and 3b. Particularly, FIG. 4 shows one embodiment in which a single front vehicle's height sensor 3a is mounted on the side of a front wheel 7 and a single vehicle's height sensor 3b is mounted on the side of a rear wheel 7, the positions of those sensors being arranged in a diagonal line with respect to the front and the rear wheels as can be seen in FIG. 4 while FIG. 5 shows another embodiment in which two vehicle's height sensors 3a are mounted on the respective sides of the front wheels 7 and two vehicle's height sensor 3b are mounted on the respective sides of the rear wheels 7.

Figure 6A:
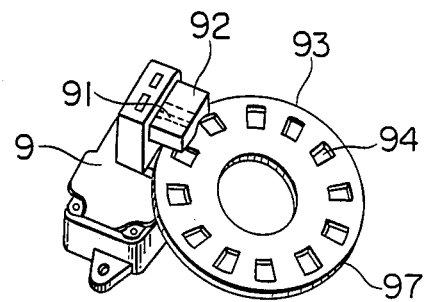
FIGS. 6A-6C show one embodiment of a steering angle sensor used in the vehicle height control system shown in FIG. 1.
Figure 6B:
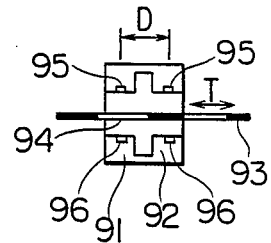
Figure 6C:
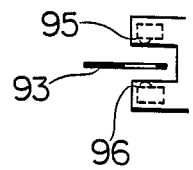

FIGS. 6A-6C show an arrangement of the steering angle sensor 9 in which FIG. 6A shows a perspective view thereof, FIG. 6B shows a front view thereof, and FIG. 6C shows a side view, for illustrating the relationship of light switches 91, 92 and a circular slit plate 97 having a plurality of slits or apertures 94 circumferentially formed therethrough. The light switches 91 and 92 respectively comprise a set of a photo-transistor 95 and an LED 96, each set forming a light switch called a photo-interrupter. With the slit plate 97 being rotated owing to the steering operation of the steering wheel 8, the plate 97 traverses the light switches, whereby the light switch 91 or 92 is switched on while the apertures 94 of the plate 97 are passing under the light switch 91 or 92, and is otherwise switched off while a mask portion 93 of the slit plate 97 other than the apertures 94 is passing under the light switch 91 or 92 to cause photo-interruption of the respective light sources. The plate 97 is mounted on the shaft 10 of the steering wheel 8 so as to rotate according to the rotation of the steering wheel 8. If the relationship between a lateral width T of the mask portion 93 or the apertures 94 in the slit plate 97 and the distance D of the transistors 95 is set so that $(3/2)T=D$ holds, the output pulse signals of the two light switches 91 and 92 will be mutually different in electrical angle by 90°.

Figure 7:
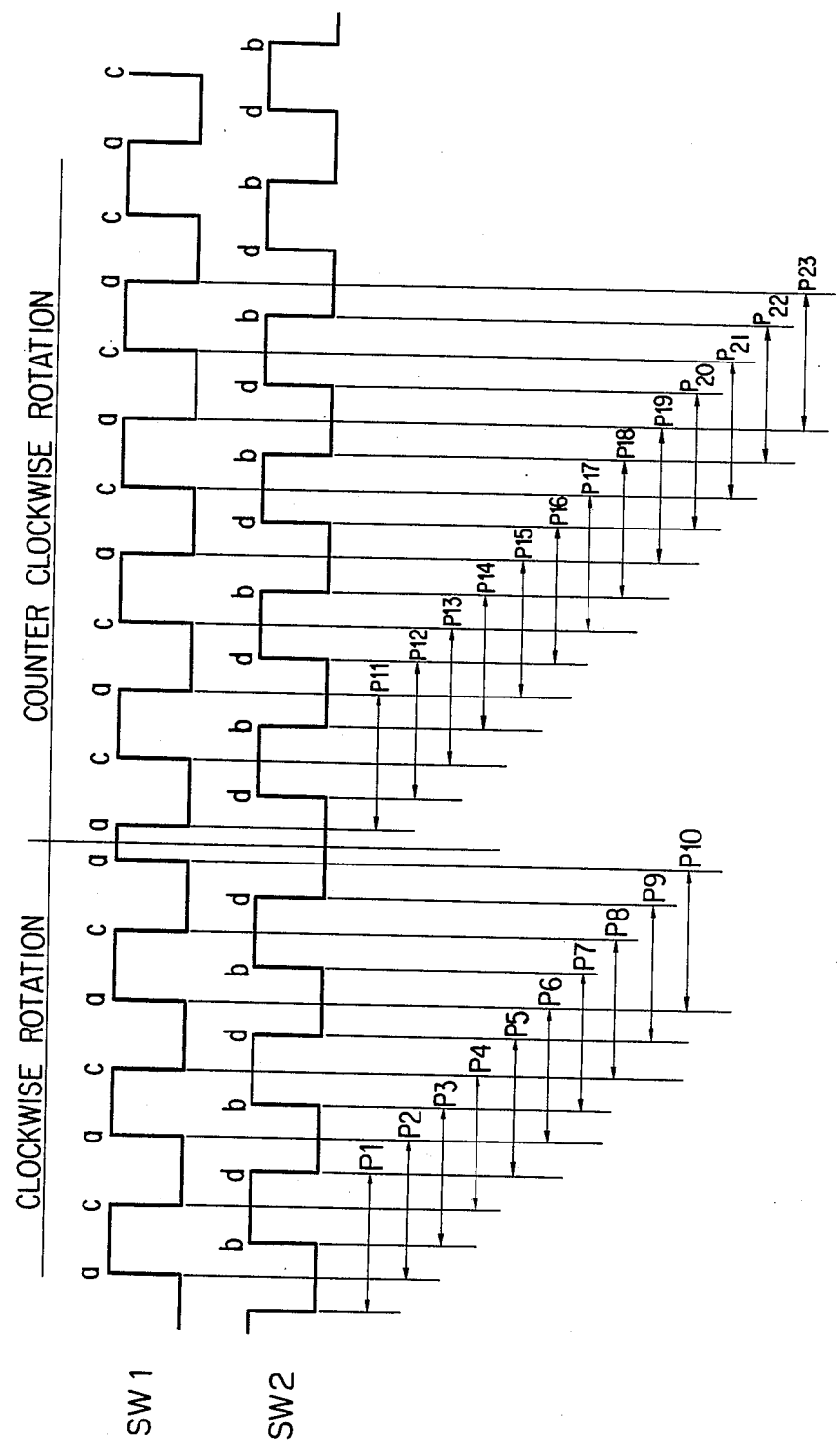
FIG. 7 shows a time chart used for calculating the steering angle, the steering direction, and the steering angular velocity of the vehicle according to the present invention.

Next, one embodiment for detecting a steering angle will be described. FIG. 7 shows waveforms SW1 and SW2 detected by the steering angle sensor 9 shown in FIG. 1. The waveforms SW1 and SW2 are respectively output from the light switches 91 and 92 of the sensor 9 at a rate of one pulse each time the steering wheel 8 is rotated by 30°, and have output pulse edges of a-c-a-c and b-d-b-d, respectively for the case where the steering wheel is rotated in the clockwise (C.W.) direction. It is to be noted that the period of these pulses corresponds to the rotating speed of the steering wheel 8. The time chart shown in FIG. 7 illustrates the case where the steering wheel is initially rotated in the clockwise direction at a uniform rate after which it is rotated in a counterclockwise (C.C.W.) direction at a uniform rate just after a pulse edge "a" of SW1 has risen. By monitoring the order in which the pulse edges are generated, i.e., a-b-c-d for C.W. rotation and a-d-c-b for C.C.W. rotation, a change in the direction of rotation can be detected. Furthermore, by measuring the intervals of the pulse edges from one pulse edge "a" to the next pulse edge "a", from one pulse edge "b" to the next pulse edge "b" and so on during the periods P1, P2, P3, P4,—and so on as shown in FIG. 7, the variation of the steering angular velocity can be continuously measured, and by integrating the angle of 30°/4 per inter-pulse edges of a-b, b-c, and so on during the forward rotation, the total steering angle can be detected.

When the rotating direction of the steering wheel 8 is reversed from the C.W. direction to the C.C.W. direction, the respective change in the order of pulse edge generation from a-b-c-d to a-d-c-b is detected, whereby the determination of the steering angular velocity from the edge intervals and the calculation of the total steering angle are once interrupted.

Then, by detecting that the order in which the pulse edges are generated is a-d-c-b-a, it can be determined that the steering wheel's rotation is C.C.W., and by calculating the steering angular velocity or the total steering angle momently from the periods of P11, P12, P13, P14 and so on as shown in FIG. 7, it is possible to detect the steering angular velocity and the steering angle per se in the C.C.W. rotation as in the C.W. rotation.

It is clear that such a detection method and a calculation can be readily realized by employing a micro-computer, by counting the periods of the pulse edge intervals each time the pulse edges of SW1 and SW2 are input to the micro-computer, and by counting the passing frequency of the pulse edges and storing the same in a memory.

Also, since the steering angular velocity and the total steering angle can be updated every 30°/4, i.e., during the period P1, then the period P2, then the period P3, and so on in this embodiment, a highly accurate detection of the steering angle having a good responsiveness can be achieved. It is to be noted that while this embodiment has been described with the steering angle sensor 9 outputting one pulse each time the steering wheel is rotated by 30°, such a steering wheel sensor may be of a type which issues one pulse per any number of degrees (rotary angles).

Figure 8:
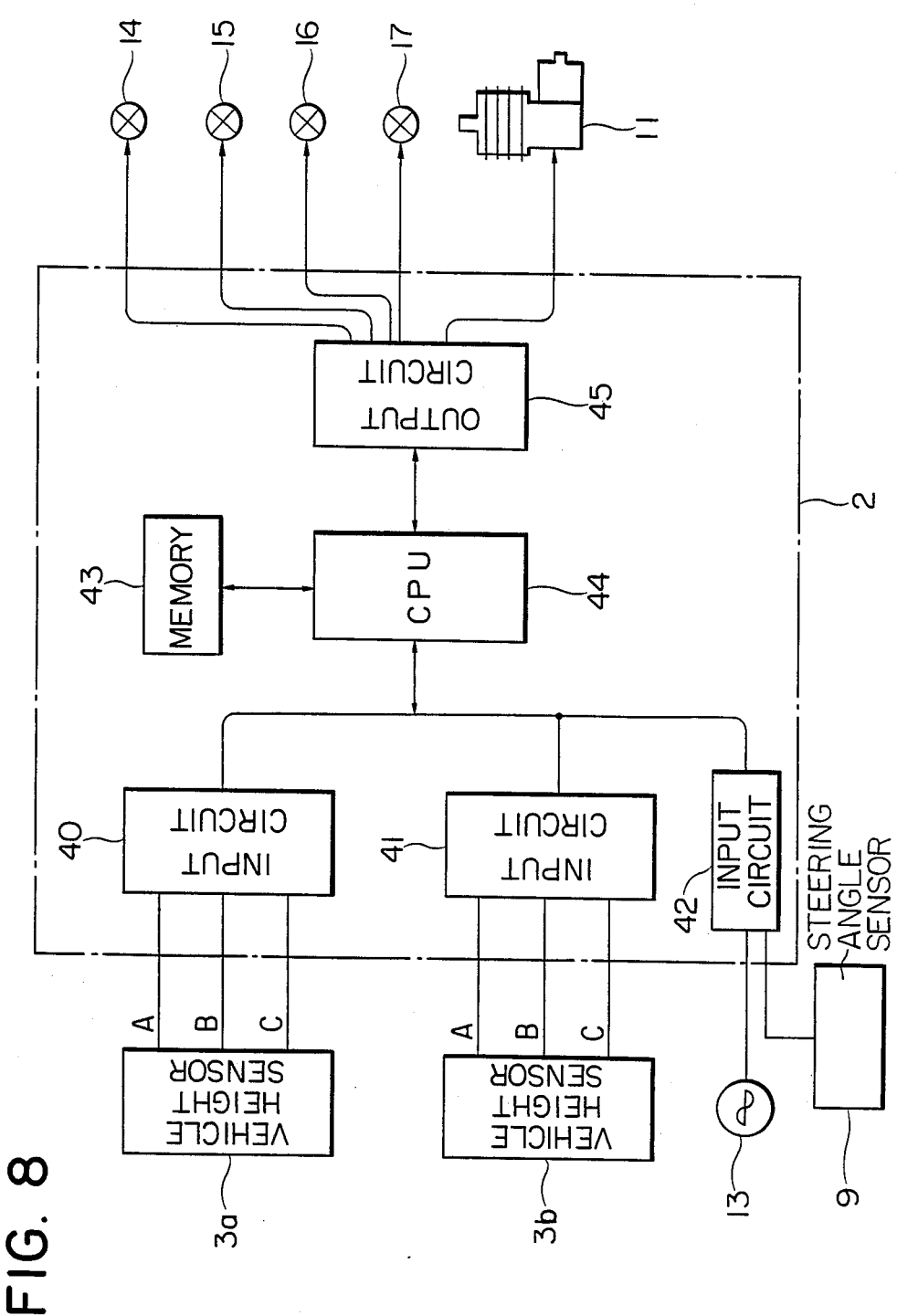
FIG. 8 shows a block diagram of one embodiment of a control unit used in the vehicle height control system shown in FIG. 1; and, FIG. 9 shows a flow chart of a control operation carried out by the present invention.

In FIG. 8 showing a block diagram of the arrangement of the control unit 2 shown in FIG. 1, an input circuit 40 receives as an input therein the output of the front vehicle's height sensor 3a, an input circuit 41 receives as an input therein the output of the rear vehicle's height sensor 3b, an input circuit 42 receives as an input therein the outputs of the steering angle sensor 9 and the vehicle speed sensor 13, an output circuit 45 provides as an output therefrom control signals to the compressor 11 and the valves 14-17, and a CPU interconnects the input circuits 40-42 with the output circuit 45 as well as a memory 43.

Figure 9:
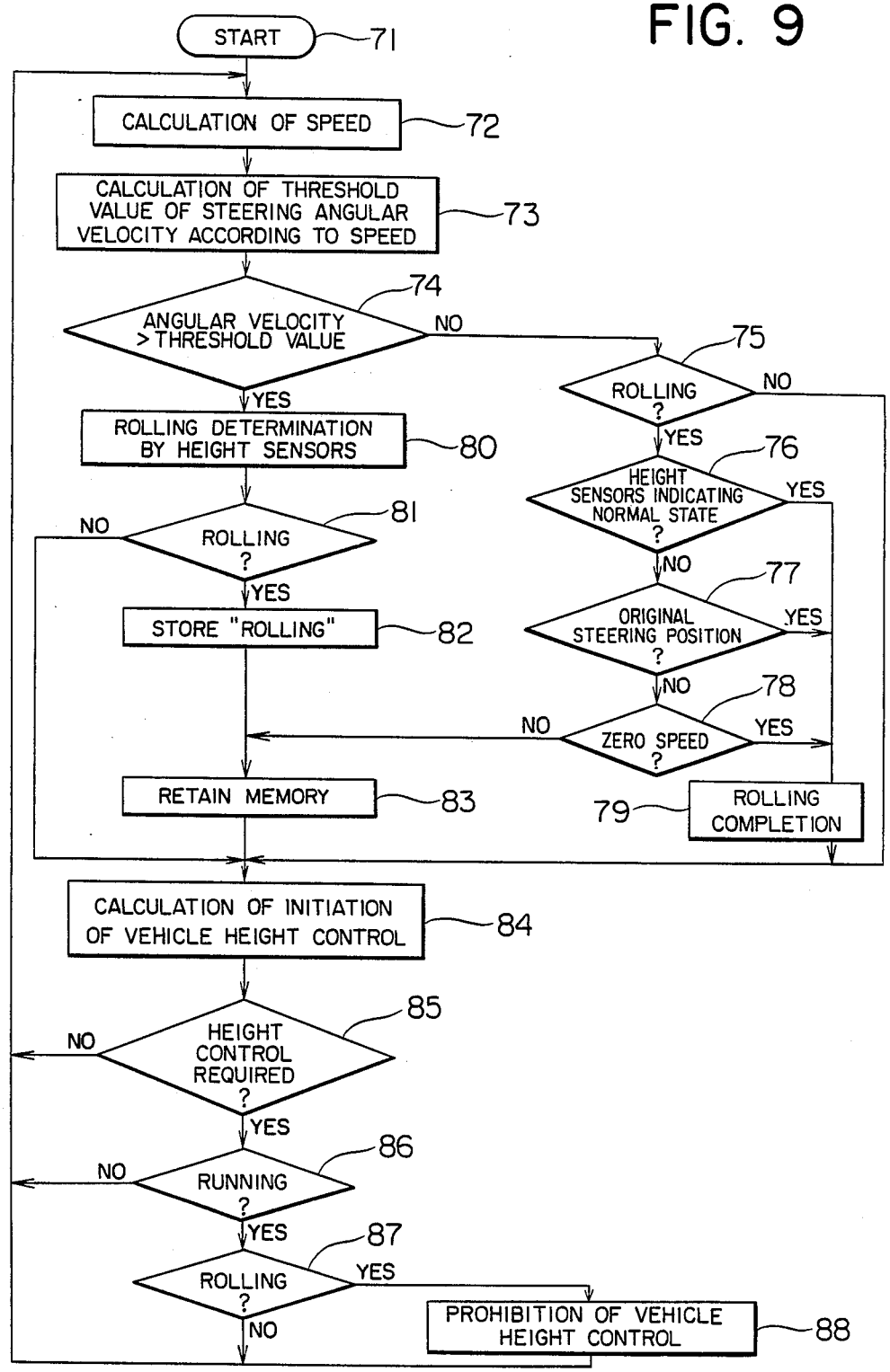

The operation of the vehicle height control system thus arranged according to this invention will now be described with reference to the flow chart shown in FIG. 9.

First of all, the current speed of the vehicle is calculated in order to actively take advantage of the vehicle height control function to adjust the vehicle's height to multi-levels according to the vehicle speed, or to change the time interval for determining the initiation of the vehicle height control according to the stopped state or the running state of the vehicle (step 72). It is well known to any one of ordinary skill in the art to determine the vehicle speed from the average value of the periods of the output pulses of the speed sensor 13.

Then, a threshold value for the steering angular velocity is calculated (interpolated among various stored threshold values) according to the vehicle speed determined as above, in order to detect a certain rolling state at all times by changing the above threshold value according to the vehicle speed because the higher the vehicle speed becomes, the larger the lateral acceleration which the vehicle's body 1 may be subject to becomes with respect to the steering angular velocity (step 73). Therefore, a higher threshold value is selected for a low vehicle speed while a lower threshold value is selected for a high vehicle speed.

The steering angular velocity is then calculated by using the output of the steering angle sensor 9, and is then compared with the above noted threshold value for the steering angular velocity according to the current vehicle speed (step 74). If the steering angular velocity exceeds the threshold value, it is then determined whether or not the vehicle is rolled by monitoring the respective output signals of the height sensors (step 80). On the other hand, if it is determined in step 75 with reference to the state of the memory 43 which will be described later that the vehicle has been rolled even though it is determined in step 74 that the threshold value is not exceeded, it is determined in steps 76-78 whether or not the vehicle is being continuously rolled.

The determination of the presence/absence of the rolling is carried out by the use of the output information of the vehicle's height sensors 3a and 3b mounted on the side of the front and the rear wheels as indicated in step 80. As already mentioned, the vehicle's height sensors 3a and 3b are mounted one each at respective positions in a diagonal line to the front and the rear wheels 7 as shown in FIG. 4, or they are mounted two each, i.e. four in total at the respective positions of the front and the rear wheels 7 as shown in FIG. 5. This description will now be made with reference to the case where the vehicle's height sensors are disposed as shown in FIG. 4.

Although the vehicle's height sensors may detect the distance, divided into some levels or stages, between the vehicle's body 1 and the vehicle's wheel axle 30, it is now assumed for convenience's sake that the vehicle's height sensors output a logic "high" (H) signal when the level of the vehicle's body 1 is higher than a normal level while they output a logic "low" (L) signal when the level of the vehicle's body 1 is lower than the normal level. In a usual change of the load weight due to passengers getting on or off the vehicle, it is assumed that both of the vehicle's height sensors output H or L signal, or either of them output H or L signal.

The logic output of the vehicle's height sensors 3a, and 3b in the above noted normal condition serves to initiate the vehicle height control to restore the vehicle's height to the normal level. However, since the vehicle's body 1 is rolled during the turning, the vehicle's height sensors output H or L signal as indicated above in spite of no change of the load weight. Namely, in FIG. 4, turning to the right, the vehicle's body 1 is inclined to the left due to the centrifugal force whereby the front and the rear sensors 3a and 3b respectively output H and L signals. Conversely, turning to the left, the vehicle's body 1 is inclined to the right whereby the sensors 3a and 3b respectively output L and H signals. Therefore, by the comparison of the outputs of the front and the rear vehicle's height sensors 3a and 3b, it can be determined which side (right or left) of the vehicle's body 1 is rolled (step 81).

Thus, if it is determined at step 74 that the steering angular velocity exceeds the threshold value and if it is determined at step 81 from the information of the vehicle's height sensors 3a and 3b that the vehicle's body 1 is rolled, this state is stored for example, by storing a roll flag in the memory 43 in step 82.

On the other hand, if it is determined in step 74 that the steering angular velocity is lower than the threshold value, it is then determined in step 75 with reference to the state of the memory 43 whether or not the vehicle's body 1 is now being rolled as mentioned above. If it is being rolled, it is then determined in steps 76-78 whether or not the rolling has been completed. Namely, the completion of the rolling is determined in step 79 to reset the memory 43, by meeting at least one of the requirements that the outputs of the vehicle's height sensors have indicated the state free from rolling (step 76), the steering wheel 8 has returned to the normal position (step 77), and the vehicle speed has become 0 Km/h (step 78). If none of the above requirements are met, it is determined that the vehicle's body 1 is still being rolled, and the memory 43 which has already stored the state of rolling in step 82 stores this state indicating the rolling, in step 83. It is to be noted that step 76 corresponds to the combination of steps 80 and 81. It is also to be noted that the significance of the memory 43 resides in determining whether or not the rolling has ceased.

Then in step 84, the determination of the initiation of the vehicle height control is carried out from the information of the vehicle's height sensors 3a and 3b, and if the vehicle height control is found to be necessary in step 85, it is then determined in step 86 from the output of the speed sensor 13 whether the vehicle is running or stopped. If the vehicle is running, it is then determined in step 87 whether or not the vehicle's body 1 is now being rolled, as done in step 80. If the vehicle is not running (stopped) or is running but not being rolled, then the vehicle height control is initiated while if the vehicle is running and being rolled, then in step 88 the vehicle height control is inhibited until the completion of the rolling of the vehicle.

Thus, it is possible to prohibit the vehicle height control with respect to such an apparent change or variation of the vehicle's height. Also, if there is a change of the vehicle's height when the rolling is completed or when the rolling is absent, the vehicle height control can be immediately done.

The detection of the steering direction and the steering angular velocity may be readily made by means of a sensor which generates two pulse trains having a phase difference therebetween of approximately 90°, one pulse being generated per a predetermined rotation of the steering wheel, in which the steering direction is detected on the basis of the order of the pulse edges and the steering angular velocity or the steering angle in the rotation of the same direction is updated per the edges of the two pulse trains.

As stated above, according to the present invention, from the steering angular velocity of a steering wheel from a steering angle sensor and the output information of vehicle's height sensors, that the vehicle is being rolled is detected in which case an unnecessary vehicle height control irrespective of any change of the actual load weight is avoided by prohibiting the vehicle height control from operating even though the outputs of the vehicle's height sensors indicate some deviation of the vehicle's height from a target level, resulting in a highly reliable vehicle height control system.

It is to be noted that while the present invention has been described with reference to the above embodiments illustrated in the accompanying drawings, it should not be limited to them and may be applied with various modifications thereof without departing from the spirit of the invention.

What we claim is:

1. A vehicle height control system on a vehicle having a body supported on front and rear wheels by a suspension means, said control system including:
   vehicle body height sensors associated with said front and rear wheels detecting and producing outputs representing height of the vehicle body on both sides of the vehicle with respect to the vehicle wheels,
   a steering angle sensor detecting and producing an output representing steering angle of a steering wheel of the vehicle,
   a vehicle speed sensor detecting and producing an output representing speed of the vehicle wheels, and
   a control unit connected to operate said suspension means to adjust the height of said vehicle body to maintain a reference level based upon the outputs of said front and rear wheel body height sensors,
   said control unit comprising first means for determining whether the vehicle is turning and in a rolling state,
   said first means including means for determining vehicle speed based on the output of said vehicle speed sensor, for determining steering angular velocity based on the output of said steering angle sensor, and for detecting a rolling state of the vehicle based on:
   (1) that the vehicle speed is not zero,
   (2) a threshold value of steering angular velocity according to vehicle speed, and
   (3) comparing the outputs of said vehicle body height sensors to determine, based on the pattern of their outputs, an amount of side-to-side inclination of the vehicle body indicating the rolling state, and
   second means for inhibiting said control unit from operating said suspension means to adjust the height of the vehicle body when the vehicle is turning and in the rolling state as determined by said first means.

2. A vehicle height control system as claimed in claim 1 wherein said vehicle body height sensors are disposed along a diagonal of the vehicle with one sensor being associated with the front wheels and another sensor being associated with the rear wheels of the vehicle.

3. A vehicle height control system as claimed in claim 1 wherein one of said vehicle body height sensors is associated with each of the front and the rear wheels of the vehicle.

4. A vehicle height control system as claimed in claim 1 wherein said second means continues to inhibit said control unit when the vehicle has been previously in a rolling state, the outputs of said vehicle body height sensors do not indicate a normal state, said steering wheel is not returned to its neutral position, and the speed of the vehicle is not zero.

5. A vehicle height control system as claimed in claim 1, wherein said first means including a memory further comprises means for storing the rolling state of the vehicle.

6. A vehicle height control system as claimed in claim 1 wherein said second means ceases to inhibit said control unit from operating said suspension means when the outputs of said vehicle body height sensors indicate a normal state, said steering wheel is reversely rotated to return to its neutral position, and the speed of the vehicle becomes zero.

7. A vehicle height control system for a vehicle having a body supported on front and rear wheels by a suspension means, said control system comprising:
   vehicle body height sensors associated with said front and rear wheels for detecting and producing outputs representing the height of the vehicle body on both sides of the vehicle with respect to the vehicle wheels;
   a steering angle sensor for detecting and producing an output representing the steering angle of a steering wheel of the vehicle;
   a vehicle speed sensor for detecting and producing an output representing the speed of the vehicle wheels; and
   a control unit connected to operate said suspension means to adjust the height of said vehicle body to maintain a reference level based upon the outputs of said front and rear wheel body height sensors;
   said control unit comprising first means for storing a roll flag in a memory when the vehicle is determined to be turning and in a rolling state based on the steering angular velocity, vehicle speed, and vehicle body height detected by said steering angle sensor, said vehicle speed sensor, and said vehicle body height sensors;
   second means for resetting said memory when the vehicle is determined to be not turning and not in the rolling state based on the steering angular velocity, the vehicle speed, and the vehicle body height detected by said steering angle sensor, said vehicle speed sensor, and said vehicle body height sensors; and
   third means for inhibiting said control unit from operating said suspension means to adjust the height of the vehicle body when said roll flag is stored in said memory and the vehicle is determined to be in the rolling state based on the vehicle body height detected by said vehicle speed sensors.

* * * * *

UNITED STATES PATENT AND TRADEMARK OFFICE
CERTIFICATE OF CORRECTION

PATENT NO. : 4,803,630

DATED : February 7, 1989

INVENTOR(S) : Takizawa et al

It is certified that error appears in the above-identified patent and that said Letters Patent is hereby corrected as shown below: On the Title Page, Item [73] Assignee:

should read -- Mitsubishi Denki Kabushiki Kaisha and
Mitsubishi Jidosha Kogyo Kabushiki Kaisha Signed and Sealed this Eighth Day of August, 1989

*Attest:*

DONALD J. QUIGG

*Attesting Officer*  *Commissioner of Patents and Trademarks*